(12) United States Patent
Salyer (10) Patent No.: US 11,399,510 B2
(45) Date of Patent: Aug. 2, 2022

(54) PLUSH PET TOY

(71) Applicant: Danielle Salyer, Denver, CO (US)

(72) Inventor: Danielle Salyer, Denver, CO (US)

( * ) Notice: Subject to any disclaimer, the term of this patent is extended or adjusted under 35 U.S.C. 154(b) by 114 days.

(21) Appl. No.: 17/061,540

(22) Filed: Oct. 1, 2020

(65) Prior Publication Data
US 2022/0104458 A1 Apr. 7, 2022

(51) Int. Cl.
*A01K 29/00* (2006.01)
*A01K 15/02* (2006.01)

(52) U.S. Cl.
CPC .................. *A01K 15/025* (2013.01)

(58) Field of Classification Search
CPC ..... A01K 15/025; A01K 15/026; A01K 15/02
See application file for complete search history.

(56) References Cited

U.S. PATENT DOCUMENTS

| | | | | |
|---|---|---|---|---|
| 4,321,888 A * | 3/1982 | Topliffe | ............... | A01K 15/025 473/576 |
| 6,681,721 B1 * | 1/2004 | Buschy | ................. | A01K 15/02 119/707 |
| 7,543,550 B2 * | 6/2009 | Simpson | .............. | A01K 15/025 119/708 |
| 7,878,151 B2 * | 2/2011 | Tsengas | ............... | A01K 15/025 119/707 |
| 10,721,915 B1 * | 7/2020 | Tsengas | ............... | A01K 15/025 |
| 2002/0144660 A1 * | 10/2002 | Curry | ................... | A01K 15/026 119/707 |
| 2003/0213440 A1 * | 11/2003 | Kelly | .................. | A01K 15/025 119/708 |
| 2005/0066911 A1 * | 3/2005 | Lubeck | ................ | A01K 15/025 446/183 |
| 2005/0178343 A1 * | 8/2005 | Lubeck | ................ | A01K 15/025 119/709 |
| 2007/0062461 A1 * | 3/2007 | Lubeck | ................ | A01K 15/026 119/709 |
| 2007/0234969 A1 * | 10/2007 | Lynch | ................... | A01K 15/02 119/707 |
| 2008/0098963 A1 * | 5/2008 | Ritchey | ............... | A01K 15/025 119/707 |
| 2011/0226191 A1 * | 9/2011 | Curry | ................... | A01K 15/026 29/527.1 |
| 2011/0277696 A1 * | 11/2011 | Rutherford | .......... | A01K 15/026 427/256 |
| 2014/0299070 A1 * | 10/2014 | Harrington | .......... | A01K 15/025 119/707 |
| 2015/0053143 A1 * | 2/2015 | Gratza | ................. | A01K 15/025 119/707 |
| 2015/0289482 A1 * | 10/2015 | Nunn | ................... | A01K 15/025 119/709 |
| 2017/0094944 A1 * | 4/2017 | Knight | ................ | A01K 15/026 |
| 2020/0390065 A1 * | 12/2020 | Seadler | ................ | A01K 15/026 |
| 2021/0112777 A1 * | 4/2021 | Watts | ....................... | G10K 5/00 |
| 2021/0112778 A1 * | 4/2021 | King | ..................... | A01K 15/026 |

\* cited by examiner

*Primary Examiner* — Trinh T Nguyen
(74) *Attorney, Agent, or Firm* — Patent Partners LLC (57) ABSTRACT

The invention is a pet toy with a plush character housed within a molded ball that allows a user to pull the entire plush toy out of the ball, revealing a surprise character. The plush characters are malleable and may be reinserted by the user to have the put pull the toy out repeatedly. Special blister packaging allows for about an inch of tail to stick out, but not reveal the character.

1 Claim, 9 Drawing Sheets

PLUSH PET TOY

FIELD

The present invention relates generally to stimulating, encouraging and motivating games and methods of playing regarding pets, e.g. dogs and cats. More particularly, the invention relates to motivational games, toys and methods for assessing the pet training skills in the form of games or puzzles that incite pet interaction and memory skills.

The present inventive toy is a molded TPE ball with an opening in which a malleable plush character may be pulled from the ball. The ball and the packaging have openings so that about an inch of tail extends therefrom where a user can see and feel the tail materials, but the blister packaging obscures the character—thus being a surprise.

BRIEF DESCRIPTION OF THE INVENTION

The novel design of the inventive toy is comprised of a molded TPE ball wherein a surprise plush character is contained within the ball and can be pulled out via openings in the top and bottom of the ball. The clear plastic blister packaging wrap is design so that a piece of the character's tail extends out so a user can see and feel the tail, but the colors of the tail tips are the same so each internal plush toy is a surprise once the package is opened by a pet owner.

The object of the present invention is to motivate and maintain interest of a pet. There are at least 3 three characters in the toy series. A monkey, a cheetah, and a unicorn. Certainly, additional characters can be added without adding new matter.

The toys are packaged in a clear plastic blister packaging wrap wherein the ball is visible within the clear plastic blister packaging wrap, and a portion of internal toy tail with extends from an opening in the blister wrap. The colors of the tail tips are identical so that a user is surprised by which character they get from inside the ball. The clear plastic blister packaging wrap shows the characters in the series but does not disclose which character is inside.

BACKGROUND OF THE INVENTION

The invention most closely corresponds with USPTO Class 119/707 wherein Class 119 relates to animal husbandry and sub-class 707 includes toys.

In its simplest form, the invention relates to a novel toy for pets wherein a pet can solve the puzzle of pulling the plush toy with extended tail out of the TPE ball enclosure. Thus, the pet owner also has two toys. The ball itself, and the plush toy within the TPE ball. The toy can then be reinserted for the pet to solve the puzzle again.

THE INVENTION

Summary, Objects and Advantages

It well known that pets do experience a sense of boredom, and if not addressed, may manifest in negative behavior such as chewing furniture or going to the bathroom in undesirable locations in the pet owner's home. The inventive toy is designed to capture and retain a pet's interest whether the pet owner is away or home. The toy can be reinserted by the pet owner so that the puzzle requires solving again by the pet.

BRIEF DESCRIPTION OF THE DRAWINGS

The invention is described in further detail by reference to nine (9) drawings sufficient in detail to describe the invention in which:

FIG. 9 shows the TPE ball with opening.

DETAILED DESCRIPTION, INCLUDING BEST MODES OF CARRYING OUT THE INVENTION

Figure 1:
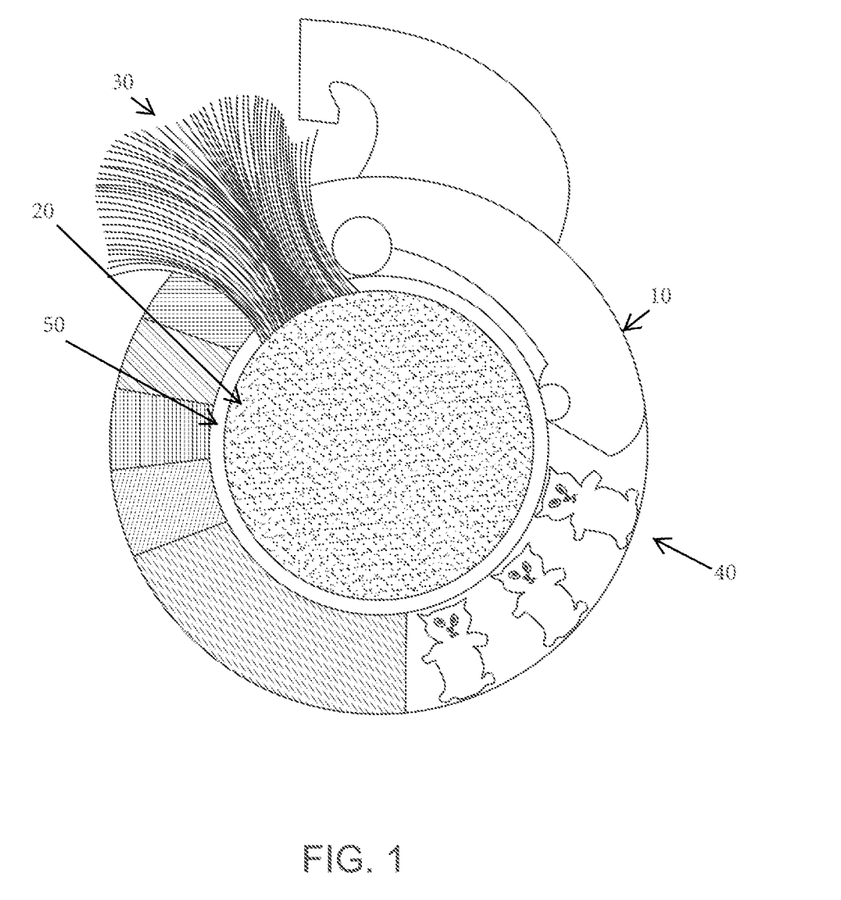
FIG. 1 is an illustration of the front of the blister packaging showing the visible ball and section of tail.

FIG. 1 shows the clear plastic blister packaging wrap 10 as the user will be able to see the TPE (thermoplastic elastomer) ball 20 and the possible surprise characters that might be inside the TPE ball 20. A short portion of the tail a bit over an inch in length 30 extrudes from the clear plastic blister packaging wrap 10 holding the TPE ball 20. This section of tail is the same color as all characters in the series so that the internal character remains a surprise until a pet pulls it from a star-shaped opening in the TPE ball 20 (this opening portion shown in detail in FIG. 9). The TPE ball is 4 inches in diameter and is hollow molded TPE (thermoplastic elastomer). The TPE ball have a star-shaped opening 50 on one end and another opening on the opposite end (not shown in Figures) wherein a pet can pull the internal plush to therefrom. A plurality of malleable plush toy animal characters 60, 120, 150, wherein each of the plurality of malleable plush toy animal characters having facial and hair features, appendages and a tail. The clear plastic blister packaging wrap 10 having formed therein an opening (not shown in Figures), wherein one of the plurality of malleable plush toy animal characters 60, 120, 150 is being inserted within the TPE ball 20 via the star-shaped opening 50 and part of the tail extends out of the star-shaped opening 50 of approximately one-inch section of the malleable plush toy animal character's tail. The clear plastic blister packaging wrap 10 is wrapped around and surrounded the TPE ball 20 so that the star-shaped opening 50 of the TPE ball 20 aligns with the opening of the clear plastic blister packaging wrap 10 and that part of the tail also extends out of the opening of the clear plastic blister packaging wrap 10 to allow a user to see the tail but not determine which of the malleable plush toy animal character's shape or character is inside. The malleable plush toy animal character's shape or character reveal only occurs upon opening and remove the clear plastic blister packaging wrap 10 from the TPE ball 20 and allow a user to fully pull the malleable plush toy animal character out from within the TPE ball 20 from the opening on the opposite end and thereafter, the malleable plush toy animal character can be stuffed back inside the TPE ball.

Figure 2:
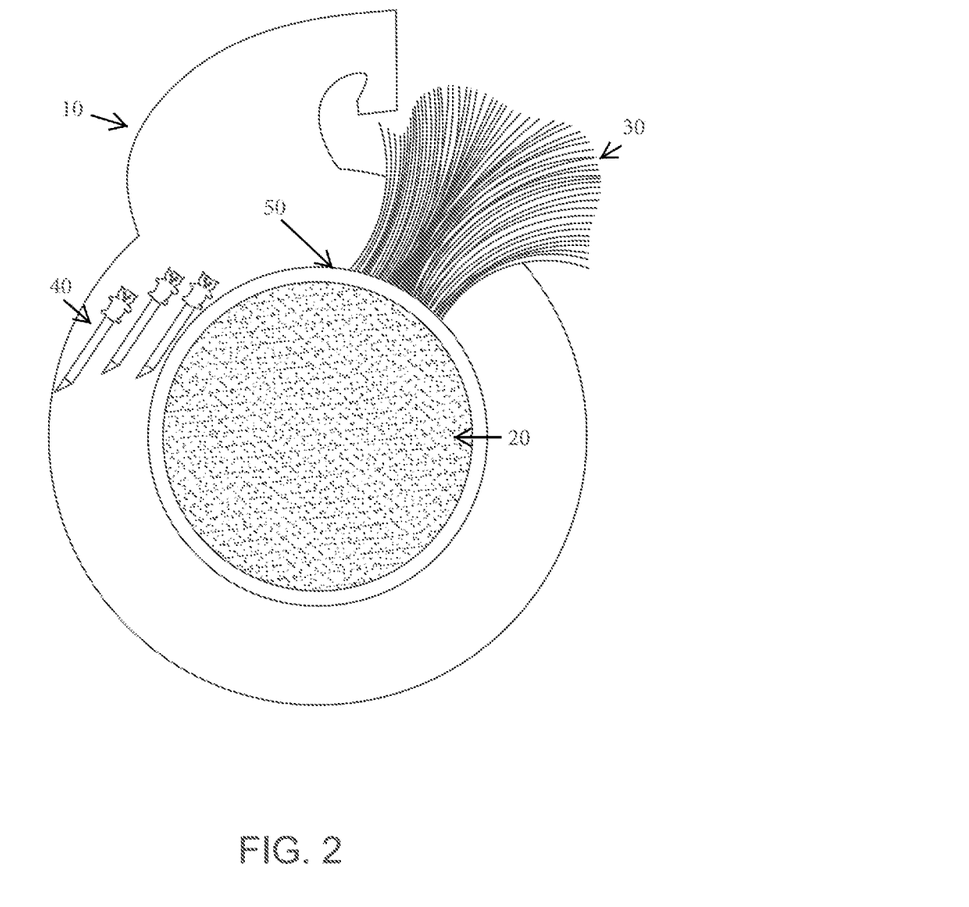
FIG. 2 is an illustration of the back of the blister packaging showing the visible ball and section of tail.

FIG. 2 is a rear perspective of the clear plastic blister packaging wrap 10 again showing the TPE ball 20 and the possible surprise characters within TPE ball 20. The tail extension 30 is extruding from the clear plastic blister packaging wrap so a user can see and feel it but cannot discern which character is contained inside the TPE ball 20 due to that section of tail being uniform to all the characters in the series. The tail portion extrudes through an opening in the TPE ball 20 and extrudes from a portion of the clear plastic blister packaging wrap.

Figure 3:
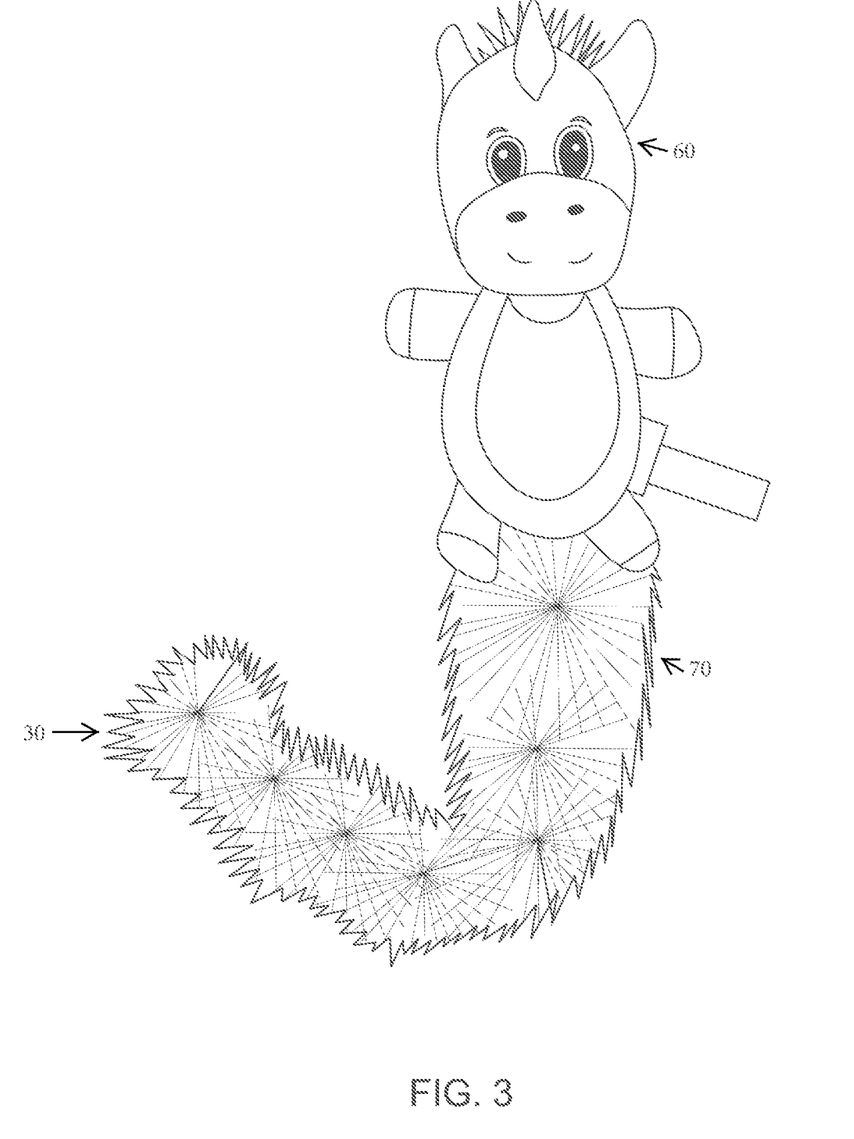
FIG. 3 is a front illustration of the unicorn plush toy that resides within the TPE ball.

FIG. 3 is an example of the unicorn character 60. Each character is made of a plush material wherein the ears, horn and head are turned construction and excludes polyfill inside to avoid a potential hazard to pets who may tear the toy. The tails of each character 70 are varied rainbow pastel colors which change in gradient to the tip of the tail 30 which will always be a uniform color to each cater to maintain the surprise element of what might be inside the ball.

Figure 4:
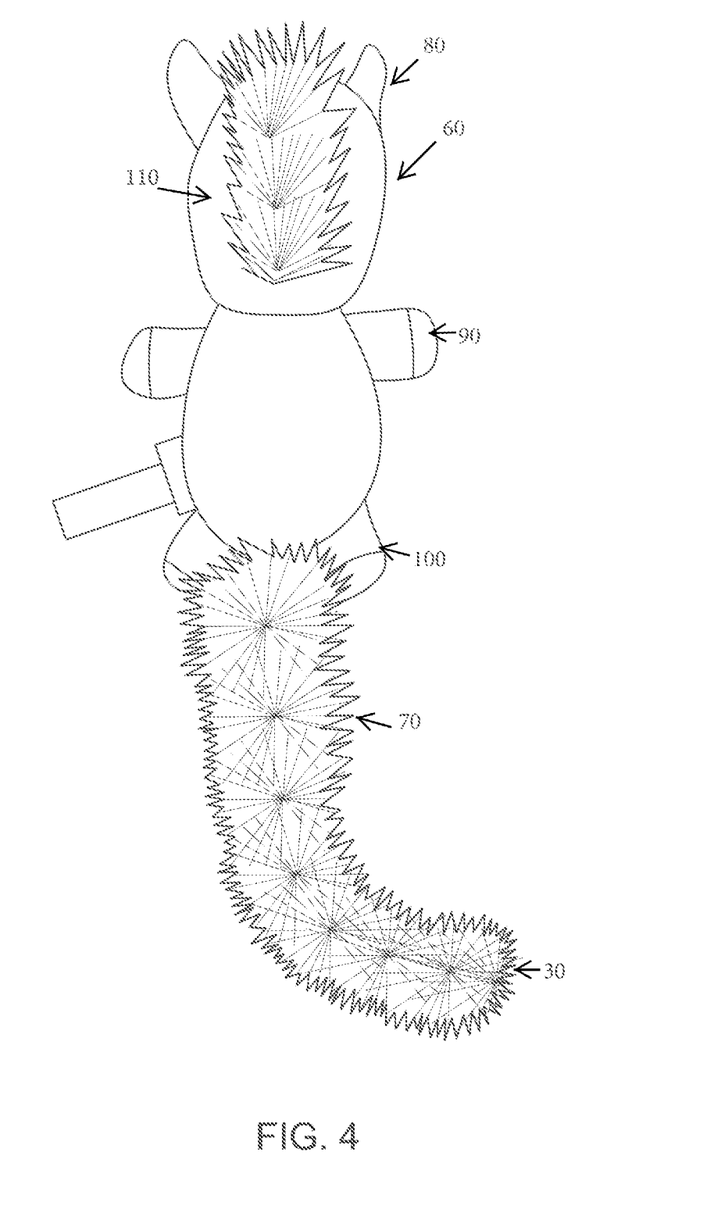
FIG. 4 is a rear view of the unicorn character.

FIG. 4 is a rear view of the unicorn character 60 which has ears 80, arms 90, feet 100 and a strip of rainbow hued plush along the crown of the character's head 110 creating a fabric mane. Again, the rainbow hued tail 70 is illustrated and the tip of the tail 30 again will be uniform to all characters in the series.

Figure 5:
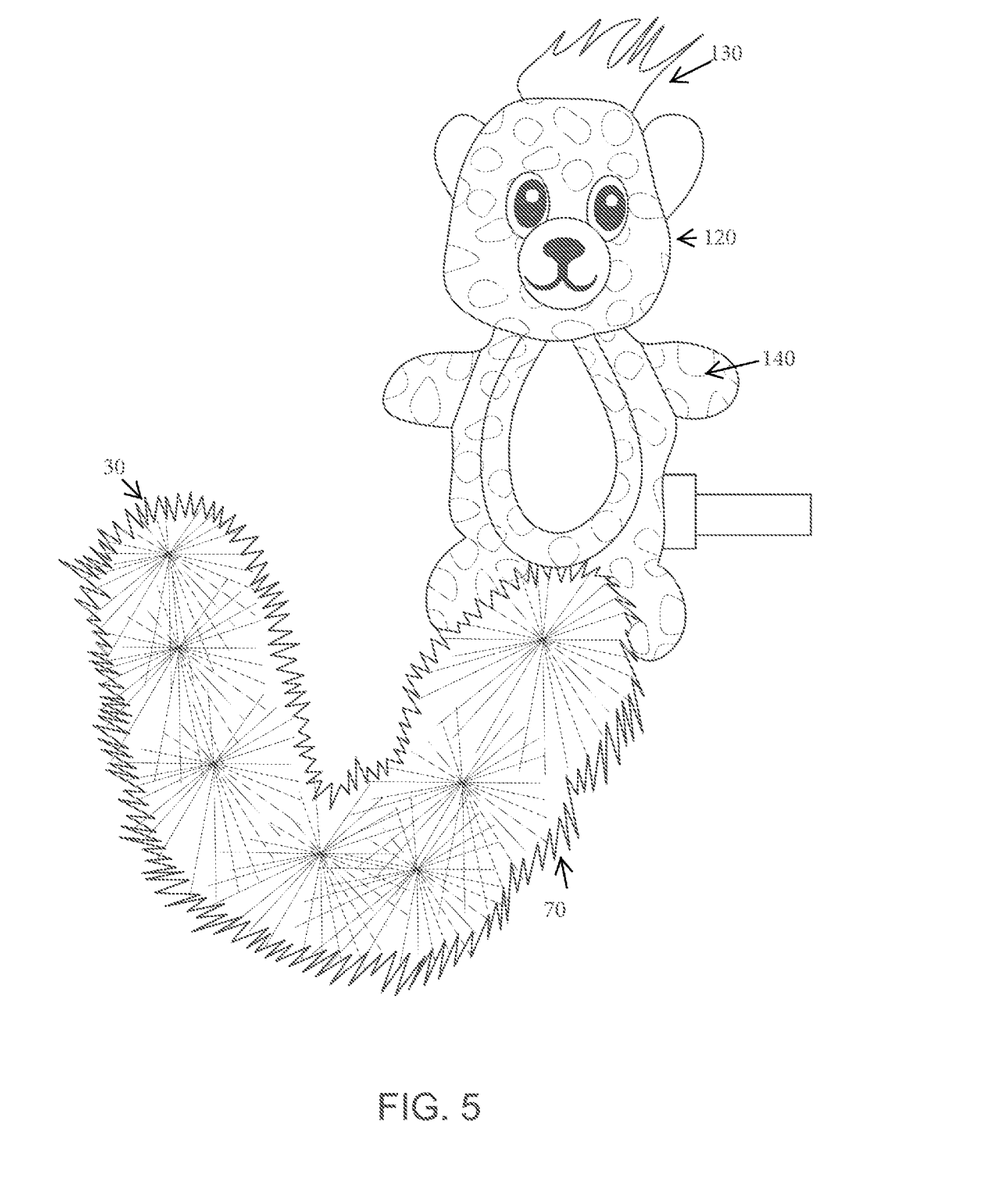
FIG. 5 is an illustration of the front of the cheetah character.

FIG. 5 illustrates the front of the cheetah character 120 and which also has an extended rainbow hued tail 70 and wherein the tip of the tail 30 will always be a color uniform to each character's tail so that a user cannot tell which of the character options will be inside the ball. The spots of the cheetah 140 clearly differentiate it from other characters. Again, there is a strip of rainbow hued plush in for the form of a mane 130 as with the unicorn character.

Figure 6:
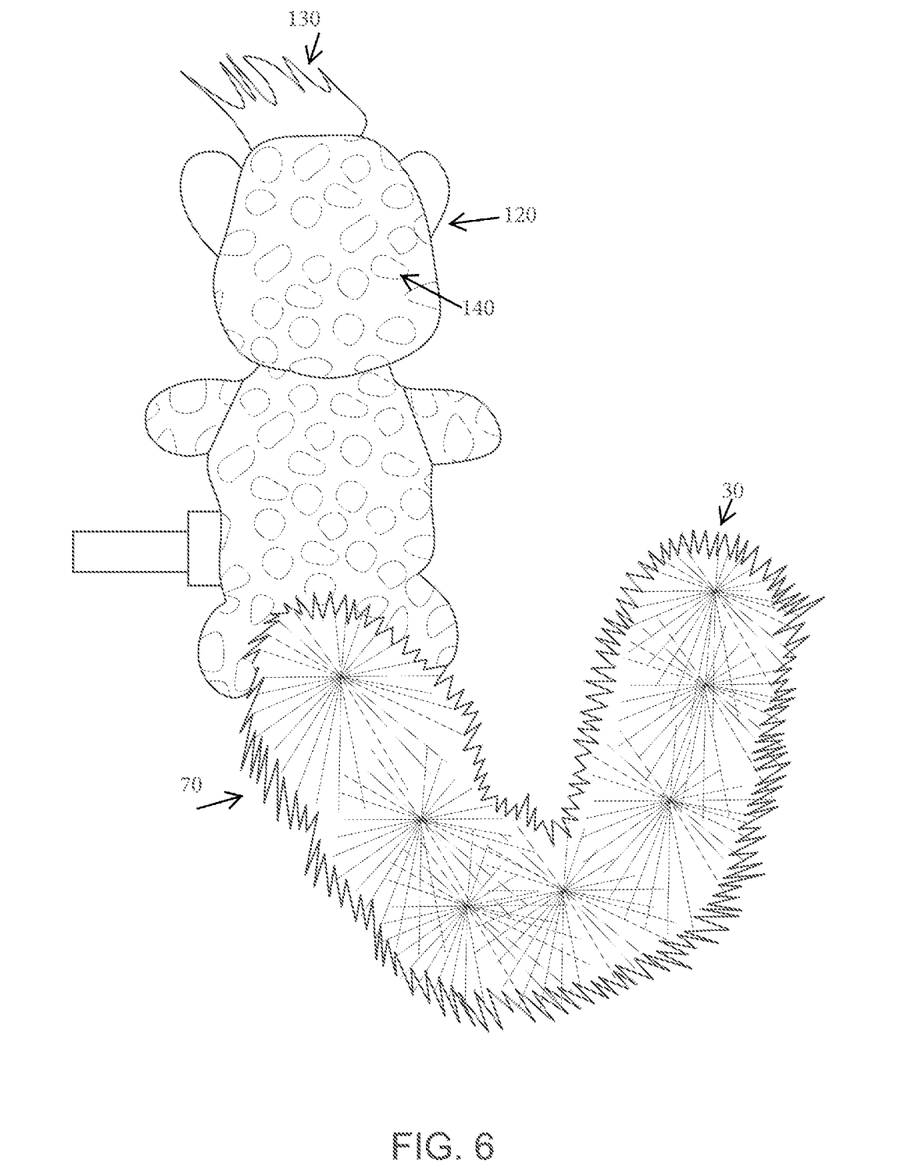
FIG. 6 is an illustration of the rear of the cheetah character.

FIG. 6 illustrates the rear of the cheetah character 120 and which also has the extended rainbow hued tail 70 and wherein the tip of the tail 30 will always be a color uniform to each character's tail so that a user cannot tell which of the character options will be inside the ball. The spots of the cheetah 140 clearly differentiate it from other characters. Again, there is a strip of rainbow hued plush sewn in for the form of a mane or hair 130 as with the unicorn character.

Figure 7:
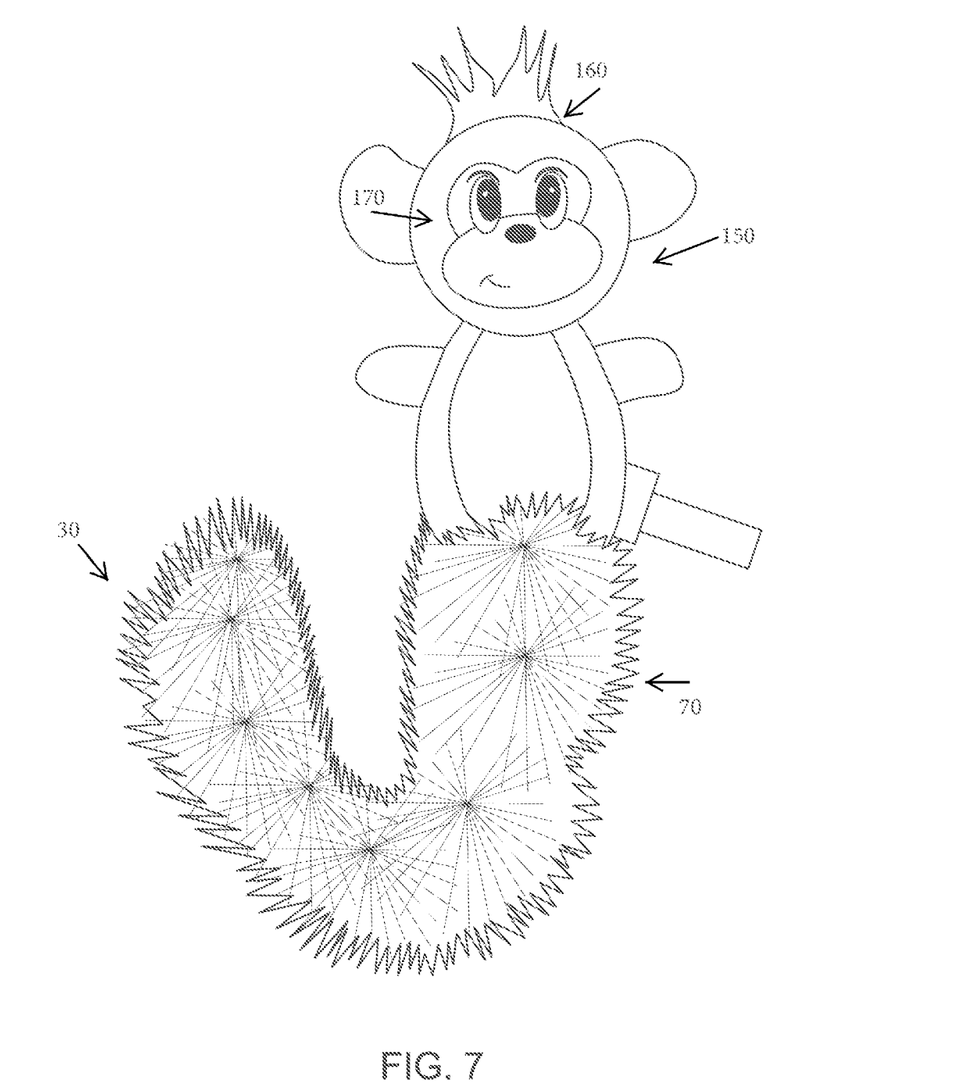
FIG. 7 shows the front of the monkey character.

FIG. 7 is an example of the monkey character 150. The monkey has an embroidered face 170, however the facial features of all characters may also be printed on the character. Certainly, it can also be appreciated that multiple characters can be made using the inventive designs. The tail 70 similar to the other characters has the one-inch protruding section 30. The monkey has a section of plush hair 160 sewn into the top of the head.

Figure 8:
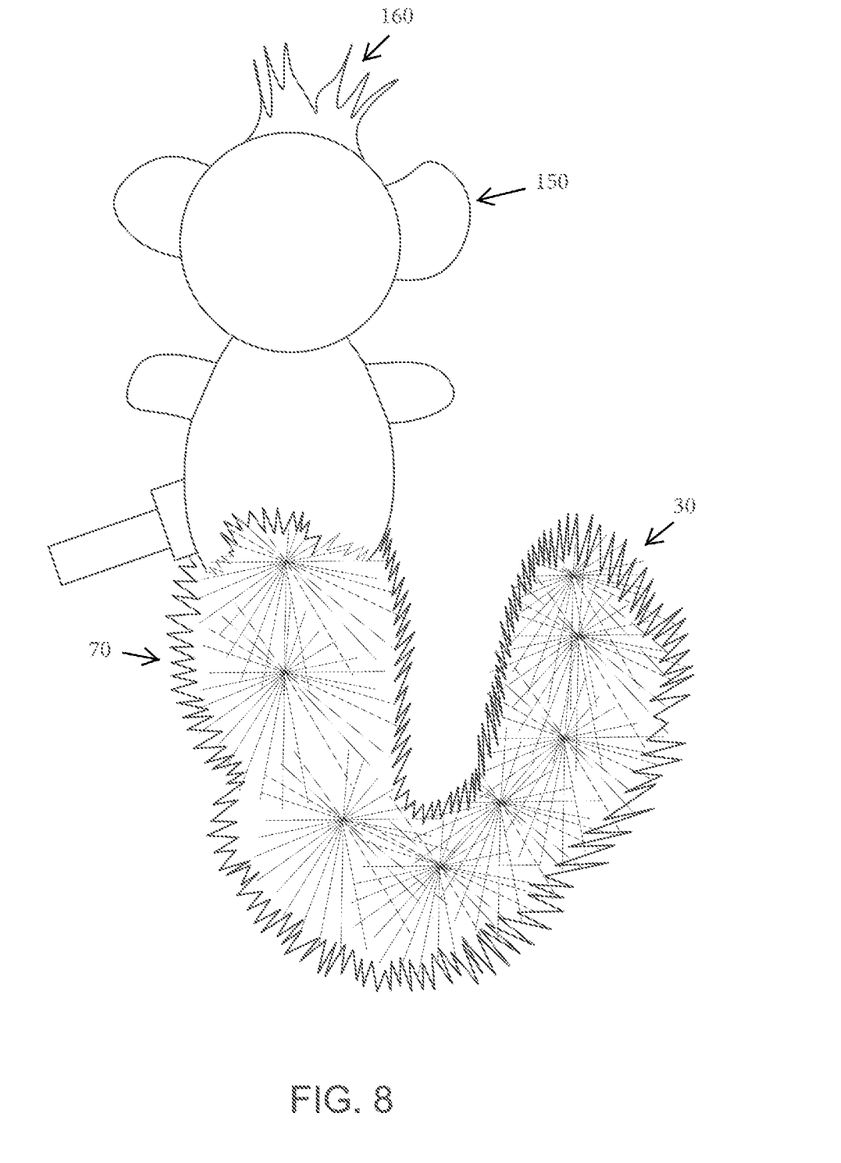
FIG. 8 illustrates the rear side of the monkey character.

FIG. 8 is the reverse side of the plush monkey character 150 and the rainbow hued tail 70 with a uniform colored tip 30.

FIG. 9 is an enlargement of the TPE ball 20 without packaging or character features. The star-shaped opening 50 is where the tails extends from, again only showing an inch or so of each tail so that the character pulled therefrom is unknown at purchase. The molded product line logo 180 "Outward Hound" is shown as molded into the TPE ball.

The invention claimed is:

1. A pet toy comprising:
   a TPE (thermoplastic elastomer) ball having formed therein a star-shaped opening on one end and another opening on the opposite end;
   a plurality of malleable plush toy animal characters, wherein each of the plurality of malleable plush toy animal characters having facial and hair features, appendages and a tail;
   a clear plastic blister packaging wrap having formed therein an opening;
   wherein one of the plurality of malleable plush toy animal characters is being inserted within the TPE ball via the star-shaped opening and part of the tail extends out of the star-shaped opening of approximately one-inch section of the malleable plush toy animal character's tail;
   wherein the clear plastic blister packaging wrap is wrapped around and surrounded the TPE ball so that the star-shaped opening of the TPE ball aligns with the opening of the clear plastic blister packaging wrap and that part of the tail also extends out of the opening of the clear plastic blister packaging wrap to allow a user to see the tail but not determine which of the malleable plush toy animal character's shape or character is inside,
   wherein the malleable plush toy animal character's shape or character reveal only occurs upon opening and remove the clear plastic blister packaging wrap from the TPE ball and allow a user to fully pull the malleable plush toy animal character out from within the TPE ball from the opening on the opposite end; and
   wherein, thereafter, the malleable plush toy animal character can be stuffed back inside the TPE ball.

* * * * *